United States Patent
Novak et al.

(10) Patent No.: US 9,104,668 B2
(45) Date of Patent: Aug. 11, 2015

(54) MIGRATING ARTIFACTS BETWEEN SERVICE-ORIENTED ARCHITECTURE REPOSITORIES

(75) Inventors: Miroslav Novak, Prague (CZ); Jan Vana, Trebon (CZ); Albert Regner, Karlovy Vary (CZ)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 13/703,289

(22) PCT Filed: Jul. 1, 2010

(86) PCT No.: PCT/US2010/040748
§ 371 (c)(1),
(2), (4) Date: Dec. 10, 2012

(87) PCT Pub. No.: WO2012/002968
PCT Pub. Date: Jan. 5, 2012

(65) Prior Publication Data
US 2013/0091099 A1    Apr. 11, 2013

(51) Int. Cl.
*G06F 17/30* (2006.01)
*G06F 9/44* (2006.01)

(52) U.S. Cl.
CPC ............ *G06F 17/30002* (2013.01); *G06F 8/36* (2013.01); *G06F 8/76* (2013.01)

(58) Field of Classification Search
CPC ................... G06F 8/10–8/76; G06F 17/30002
USPC .......................................................... 707/661
See application file for complete search history.

(56) References Cited

U.S. PATENT DOCUMENTS

| | | | |
|---|---|---|---|
| 7,016,919 B2* | 3/2006 | Cotton et al. .......................... 1/1 |
| 7,277,904 B2* | 10/2007 | Baird ..................................... 1/1 |
| 7,496,912 B2* | 2/2009 | Keller et al. .................. 717/174 |
| 7,630,965 B1 | 12/2009 | Erickson et al. |
| 7,685,140 B2* | 3/2010 | Jackson ..................... 707/999.1 |
| 7,725,469 B2 | 5/2010 | Colgrave et al. |
| 7,725,482 B2 | 5/2010 | Smith et al. |
| 8,087,013 B2* | 12/2011 | Kelly et al. ................... 717/168 |
| 8,527,985 B2* | 9/2013 | Srinivasamoorthy et al. .............................. 717/177 |
| 2002/0152210 A1* | 10/2002 | Johnson et al. ................... 707/9 |
| 2003/0144892 A1* | 7/2003 | Cowan et al. ..................... 705/8 |

(Continued)

FOREIGN PATENT DOCUMENTS

| | | |
|---|---|---|
| CN | 101441563 A | 5/2009 |
| KR | 20080084332 A | 9/2008 |
| WO | WO-2004077215 A2 | 9/2004 |

OTHER PUBLICATIONS

Korean Intellectual Property Office, International Search Report, Mar. 23, 2011, 3 pages, Daejeon, Republic of Korea.

(Continued)

*Primary Examiner* — Phuong Thao Cao
(74) *Attorney, Agent, or Firm* — International IP Law Group

(57) ABSTRACT

A method of migrating artifacts between service-oriented architecture repositories is provided herein. The method includes receiving a request to export an artifact from a first repository. The artifact comprises metadata associated with a service-oriented architecture. Additionally, the method includes retrieving data from one or more aggregated relationships of the artifact. The method also includes packaging the retrieved data into a data store comprising the selected data.

20 Claims, 9 Drawing Sheets

(56) References Cited

U.S. PATENT DOCUMENTS

| | | | |
|---|---|---|---|
| 2004/0010521 A1 | 1/2004 | Li et al. | |
| 2004/0193800 A1 | 9/2004 | Krehbiel et al. | |
| 2004/0236796 A1 | 11/2004 | Bhatt et al. | |
| 2005/0137884 A1* | 6/2005 | Baird | 705/1 |
| 2005/0192979 A1* | 9/2005 | Keller et al. | 707/100 |
| 2006/0085412 A1* | 4/2006 | Johnson et al. | 707/4 |
| 2006/0101443 A1* | 5/2006 | Nasr | 717/163 |
| 2006/0190487 A1* | 8/2006 | Hicks et al. | 707/104.1 |
| 2006/0212843 A1* | 9/2006 | Zaky et al. | 717/106 |
| 2007/0061277 A1* | 3/2007 | Boden et al. | 707/1 |
| 2007/0124688 A1* | 5/2007 | Nauerz et al. | 715/746 |
| 2007/0143744 A1* | 6/2007 | Clemm et al. | 717/128 |
| 2007/0236746 A1* | 10/2007 | Benedek et al. | 358/3.26 |
| 2008/0104581 A1* | 5/2008 | Clemm et al. | 717/162 |
| 2008/0115123 A1* | 5/2008 | Kelly et al. | 717/177 |
| 2008/0148232 A1* | 6/2008 | Clemm et al. | 717/121 |
| 2008/0168070 A1* | 7/2008 | Naphade et al. | 707/100 |
| 2008/0229303 A1* | 9/2008 | Carteri et al. | 717/177 |
| 2009/0006147 A1* | 1/2009 | Padmanabhan | 705/7 |
| 2009/0037382 A1* | 2/2009 | Ansari et al. | 707/3 |
| 2009/0055809 A1* | 2/2009 | Campbell | 717/140 |
| 2009/0094572 A1* | 4/2009 | Hegde et al. | 717/101 |
| 2009/0109225 A1* | 4/2009 | Srivastava et al. | 345/440 |
| 2009/0144694 A1* | 6/2009 | Lin et al. | 717/102 |
| 2009/0248469 A1* | 10/2009 | Williams et al. | 705/8 |
| 2009/0249295 A1* | 10/2009 | Poole | 717/120 |
| 2010/0005122 A1* | 1/2010 | Jackson | 707/104.1 |
| 2010/0023562 A1* | 1/2010 | Kreuch et al. | 707/203 |
| 2010/0042604 A1* | 2/2010 | Mechelke et al. | 707/4 |
| 2010/0077380 A1* | 3/2010 | Baker et al. | 717/120 |
| 2010/0082556 A1* | 4/2010 | Srinivasan et al. | 707/693 |
| 2010/0088283 A1* | 4/2010 | Ahmed et al. | 707/665 |
| 2010/0088350 A1* | 4/2010 | Ahmed et al. | 707/803 |
| 2010/0095298 A1* | 4/2010 | Seshadrinathan et al. | 718/100 |
| 2010/0095373 A1* | 4/2010 | Levenshteyn et al. | 726/21 |
| 2010/0122238 A1* | 5/2010 | Kannan et al. | 717/123 |
| 2010/0138251 A1* | 6/2010 | Brown et al. | 705/7 |
| 2010/0145907 A1* | 6/2010 | Carbajales et al. | 707/610 |
| 2010/0161629 A1* | 6/2010 | Palanisamy et al. | 707/756 |
| 2010/0199037 A1* | 8/2010 | Umbehocker et al. | 711/113 |
| 2010/0303339 A1* | 12/2010 | Caduff | 382/154 |
| 2010/0318933 A1* | 12/2010 | McMahan et al. | 715/772 |
| 2011/0016448 A1* | 1/2011 | Bauder et al. | 717/104 |
| 2011/0153557 A1* | 6/2011 | Bernstein et al. | 707/609 |
| 2011/0161915 A1* | 6/2011 | Srinivasamoorthy et al. | 717/101 |
| 2011/0161921 A1* | 6/2011 | Garimella et al. | 717/105 |
| 2011/0191748 A1* | 8/2011 | Kannan et al. | 717/104 |
| 2011/0231471 A1* | 9/2011 | Kudikala et al. | 709/202 |
| 2011/0239231 A1* | 9/2011 | Brown et al. | 719/328 |
| 2011/0307862 A1* | 12/2011 | Abrams et al. | 717/120 |
| 2011/0314439 A1* | 12/2011 | Colgrave et al. | 717/101 |
| 2011/0320480 A1* | 12/2011 | Kisin et al. | 707/769 |
| 2011/0321124 A1* | 12/2011 | Kisin et al. | 726/2 |
| 2012/0047185 A1* | 2/2012 | Driesen et al. | 707/803 |
| 2012/0066663 A1* | 3/2012 | Adhikary et al. | 717/104 |

OTHER PUBLICATIONS

European Patent Office, European Extended Search Report, Apr. 1, 2014, 7 pages, Munich, Germany.

Larsen, G. et al., "Suitable for Asset Lifecycle Management Service-Oriented Architecture," Jan. 12, 2006, 15 pages, available at https://www.ibm.com/developerworks/cn/rational/rationaledge/content/dec05/wilber/.

* cited by examiner

MIGRATING ARTIFACTS BETWEEN SERVICE-ORIENTED ARCHITECTURE REPOSITORIES

BACKGROUND

Service-oriented architecture is an information technology where business functionality, e.g., software application components, may be made available as shared, reusable services on a network, such as the Internet. The architecture loosely couples components that are capable of interacting in standardized, transparent ways, regardless of the platforms, vendors or technologies running the components.

Using service-oriented architecture, organizations may be more responsive and efficient because flexible, standards-based components can be developed, combined, and deployed rapidly. In business organizations, the architecture enables the rapid deployment of new technologies to capitalize on opportunities in dynamic markets.

The architecture itself is maintained with an administrative toolset where the available components are documented. This documentation is made available to potential users of the architecture to inform them what components are available, and how to use them. The documentation is typically stored in a database, or repository.

In some instances, an organization may use multiple repositories. For example, each department within an organization may have its own repository.

When an organization builds software interfaces between departments, services may be migrated, or copied, among the different repositories. When services are migrated, the associated repository data is also migrated.

Current tools that migrate repository data are limited to networked architectures. Further limits with regard to customizing what is migrated make these tools inefficient for organizations looking to capitalize on efficiencies provided by the architecture.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Figure 1A:
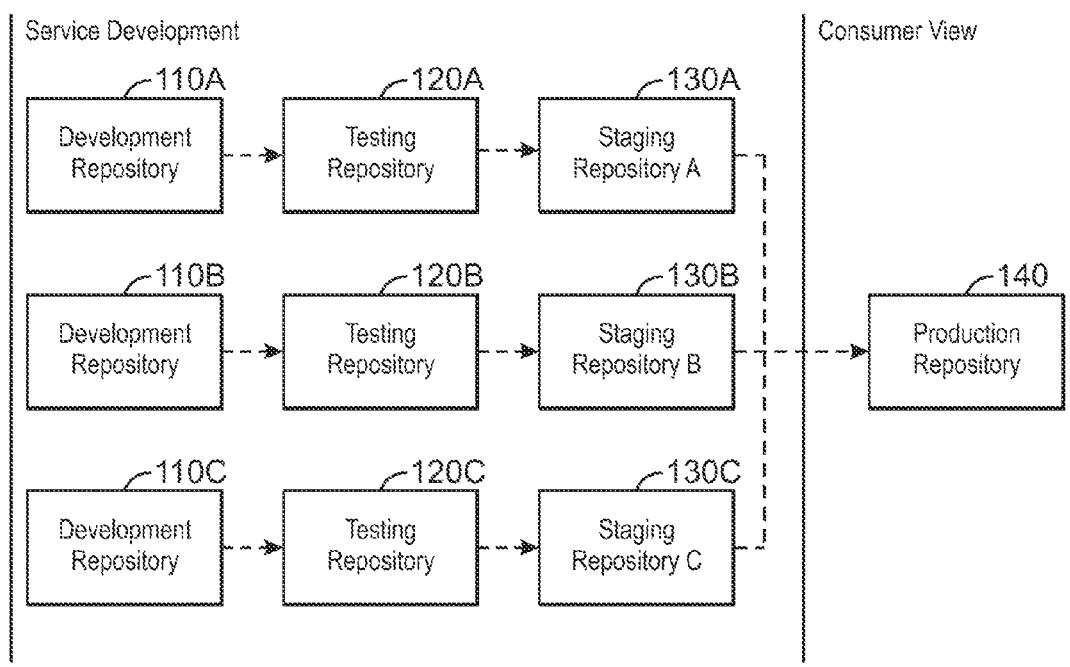
FIG. 1A is a block diagram of a system with multiple repositories for service-oriented architecture in accordance with an embodiment of the present invention.

FIG. 1A is a block diagram of a system 100 with multiple repositories for service-oriented architecture in accordance with an embodiment of the present invention. As shown, the system 100 includes development repositories 110A, 110B, 110C, testing repositories 120A, 120B, 120C, staging repositories 130A, 130B, 130C, and a production repository 140. Each of the repositories may represent one phase in the software lifecycle for a particular department in an organization.

The software lifecycle represents the different phases involved in a typical software development effort. The lifecycle includes a development phase, a testing phase, a staging phase, and a production phase.

The development phase is the phase where new software is developed, and/or modifications are made to existing software. Typically, the development phase includes unit testing, whereby the functionality of individual software components may be validated.

The development repositories 110A, 110B, 110C may include the metadata for the software that is being developed for 3 separate departments A, B, and C in an organization. Once unit-testing is complete, software components may be migrated to the testing phase, and the associated metadata may be migrated to the testing repository.

The testing phase is the phase where interactions between unit-tested software components may be validated. The testing repositories 120A, 120B, and 120C may include the metadata for the software being tested. Once the testing phase is complete, software components may be migrated to the staging phase, and the associated metadata may be migrated to the staging repository.

The staging phase is the phase where tested software may be further tested in a production-like environment. Inter-department interfaces may be validated in the staging phase. The staging repositories 130A, 130B, 130C may include the metadata for the software in the staging phase. Once the staging phase is complete, software components may be migrated to the production phase, and the associated metadata may be migrated to the production repository 140.

The production phase may represent the actual live implementation of an organization's service-oriented architecture. The production repository 140 may include the metadata for the software available for execution by consumers of the service-oriented architecture. As shown, the software implementations of all departments of an organization may be represented in a single production repository 140.

In an embodiment of the invention, the repositories may be physically separated. The physical separation may include an air gap, whereby, there is no network connection between the repositories. As such, the migration may include two separate steps: an export step, and an import step.

The export step may include exporting metadata from a source repository. For example, when migrating software components to the testing phase, the associated metadata may be exported from the development repository 110A into a physical storage device. The physical storage device may be a compact disc, or other computer-readable medium. The compact disc may then be transferred to the physical location of a destination repository, such as the testing repository 120A, where the import step may be performed.

As understood by one skilled in the art, different arrangements of repositories are possible. The system 100 is merely one possible example of an organization's service-oriented architecture repositories.

Figure 1B:
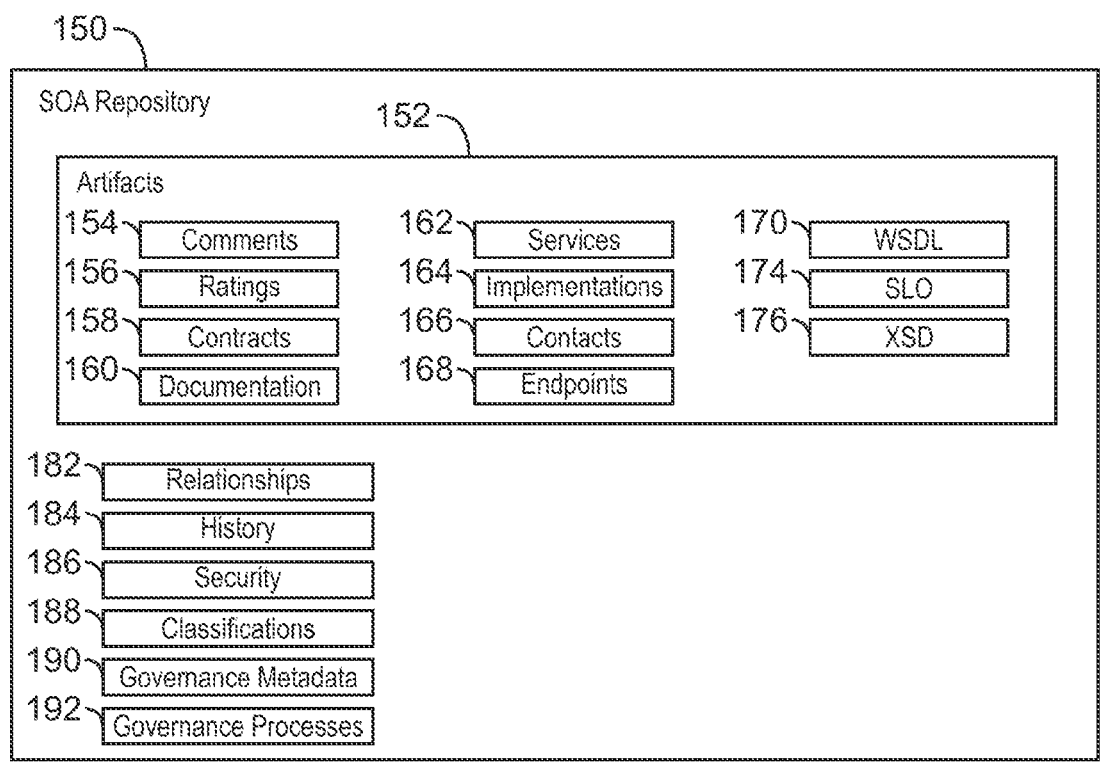
FIG. 1B is a block diagram of a service-oriented architecture repository in accordance with an embodiment of the present invention.

FIG. 1B is a block diagram of a service-oriented architecture (service-oriented architecture) repository 150 in accordance with an embodiment of the present invention. The repository 150 includes artifacts 152 and other metadata, such as, relationships 182, history 184, security 186, classifications 188, governance metadata 190, and governance processes 192.

Artifacts

The artifacts 152 may include metadata about a service, or implementation details regarding services offered in the service-oriented architecture. Artifacts 152 may also include metadata related to extensions and plug-ins.

Examples of artifacts 152 include, but are not limited to services 162, implementations 164, contacts 166, comments 154, ratings 156, contracts 158, documentation 160, endpoint 168, web services description language (WSDL) 170, service level objective (SLO) 174, and XML schema definition (XSD) 176.

Comments 154 may enable consumers of services 162 to discuss artifacts 152 in the repository 150. In some cases, consumers may provide comments 154 on artifacts 152. In such cases, may enable other consumers, or providers, to respond to comments 154. This may facilitate collaboration between multiple users of the repository 150, through the sharing of knowledge and experience.

Ratings 156 allow users to apply a rating score to artifacts 152. Consumers of the services 162 may review how other consumers rate particular artifacts 152 (e.g. services 162) and choose services 162 (or other artifacts 152) with good ratings.

Contracts 158 to model provider-consumer relationships (e.g. between services 162). Contracts 158 also document consumers, the services 162 consumed, and terms for providing the service 162.

Documentation 160 models "documents" (arbitrary document—MC Word, PDF, XLS, Diagrams, etc.) in the repository 150. Documentation 160 may be linked to related artifacts 152. These links may represent that an artifact 152 is described by, or relevant to, the documentation 160.

The service 162 represents a particular set of functionality that can be used (consumed) by other service, applications, clients. The service 162 is a unit of solution logic to which service-orientation has been applied to a meaningful extent.

The implementation 164 may represent functional elements of the service 162. Viewed in light of relationships with other artifacts 152, such as operations and endpoints 168, the implementation 164 may provide a technical description of a service 162.

The contact 166 represents people and organization units in the repository 150. The contact 166 also allows may facilitate links to artifacts 152, people, organizations, and relationships amongst the artifacts 152, people, and organizations. For example, relationships may include responsible parties, support personnel, stakeholders, etc.

The endpoint 168 specifies technical details on how to access a service 162 (implementation). The details may include specifics, such as, where and how to access the service 162.

The web services description language 170 is a standard format for describing a web service. A web services description language 170 definition describes how to access a web service, and what operations are performed. The acronym, WSDL, is usually pronounced 'whizz-dul' (to rhyme with 'whistle'). As understood by one of skill in the art, web services description language 170 WSDL is one foundation standard of web services 162, alongside others, such as SOAP and UDDI.

The service level objectives 174 are elements of a service level agreement (SLA) between a service provider and a customer, i.e., consumer of services 162. Service level objectives 174 are agreed to as a means of measuring the performance of the service provider. Advantageously, by agreeing to service level objectives 174, providers and consumers may avoid disputes that arise from misunderstandings.

The XML schema definition 176 describes and validates data XML environments. A schema is a model for describing the structure of information. The inclusion of XML schema definitions 176 is a recommendation of the world wide web consortium (W3C).

Other Metadata

Relationships 182 may describe relationships between different artifacts 152. Each of the relationships 182 may have a target and a source.

In an embodiment of the invention, the relationships 182 may be categorized as aggregate, dependent, or associative. An aggregate relationship may indicate that the target of the relationship is part of the source. In other words, metadata stored in the target artifact 152 may include metadata stored in the source artifact 152.

A dependent relationship may indicate that the source artifact 152 may depend on the target artifact 152. In a dependent relationship, the metadata stored in the source artifact 152 may be included in the target artifact 152. Associative relationships may indicate a general connection between the source and target.

The history 184 may include historical revisions to the artifacts 152. When migrating artifacts 152, users may choose whether to include all the history 184 of the artifact 152.

The security 186 may be represented in Access Control Lists (ACLs). The Access Control List may be a list of permissions associated with an artifact 152. The Access Control List may specify users or system processes allowed access to artifacts 152, and what operations are allowed on the artifacts 152.

The classifications 188 may specify a classification system for categorizing the artifacts 152. Updates to the classifications 188 may be restricted because the content of the repository 150 may be sensitive to errors in the classifications 188.

It should be noted that migrating the classifications 188 to a destination repository serves to update the classifications 188 in the destination repository. As such, in an embodiment of the invention, the classifications 188 and the artifacts 152 may be migrated separately to avoid potential errors in the destination repository.

The governance metadata 190 may identify the last approved revisions to an artifact 152. In an embodiment of the invention, a user may choose whether to migrate the latest revisions of the artifact 152, or the last approved revisions.

Governance metadata 190 may provide additional information about the state of an artifact 152. The governance metadata 190 that is migrated may be restricted to the governance metadata 190 relevant to the artifacts 152 being migrated.

Without relevant governance metadata 190 for migrated artifacts 152, as understood by one skilled in the art, something from the artifact 152 is lost and will be missing in the destination repository. Without governance metadata 190, artifacts 152 may still conform to an artifact model. However, the governance metadata 190 conforms to different rules than the artifacts 152. The different rules may be determined by, e.g., the governance framework.

The governance processes 192 may consist of stages, and transitions between stages. The stages may include development, testing, production, cancelled, and the like. Transitions may include development to testing, development to cancelled, testing to production, testing to cancelled, and the like. The governance processes 192 may facilitate the control of lifecycle of artifacts 152.

Each stage may include specifications, such as, approvers, tasks, policies, and automated actions. Approvers may be users (defined in roles or groups) who approve putting an artifact 152 in a particular stage. For example, when development of an artifact 152 is finished, a maintainer of the artifact 152 will ask for approval. The approvers may be notified, and review artifact(s) 152. The approvers then may accept/reject approval request. For transition, rules may be enforced that prevent the assignment of a transition to an artifact 152, unless a corresponding stage is approved.

The tasks may define roles and responsibilities during a stage. For examples, people in the role of developers may perform the implementation during the development stage.

The policies may include the qualifications for an artifact 152 to be approved for a stage. In this way, approvals may happen automatically. Users may be prevented from asking for approvals if the qualifications are not met.

The automatic actions may be triggered by predetermined events. For example, when an artifact 152 is approved for the production stage, the service 162 may be marked as consumable. Additionally, notifications may be sent to specific users.

Similar to the classifications 188, the governance processes 192 may be migrated separately from the artifacts 152. In such an embodiment, a full-closure of the migrating governance processes 192 may be determined. How the full-closure is determined may be specific to a particular repository. However, governance processes 192 typically include transition rules, policies and classifications, which may be included in the governance processes' closures.

In some scenarios, a governance process 192 may be changed incompatibly. For example, given process versions A and a later-developed, A', where process A governs artifacts 152. When process A is changed to process A', artifacts 152 may be governed according to the definition of the process A'.

A change may be backward compatible if the process A' may be propagated to governed artifacts 152. For example, if an approver is added, the new approver may be propagated to governed artifacts 152. As such, when an approval is requested, more approvers will be notified. The update may have no effect on artifacts 152 whose approval is already running.

However, some updates may be incompatible, if, for example, a stage is removed. If the governance process 192 is not compatible, it may be imported as a new process. As such, in the source repository, there may exist a process A, and a later version, process A'. If an incompatible change is made, then, in the target repository, there may be two different processes A and A'. These may be represented as two different entities with different identities. Accordingly, the process A may be deprecated, which may prevent the process A from being used to start governance of new artifacts 152. Instead, the process A may govern artifacts 152 that have been previously governed by the process, and the process A' may be used to govern new artifacts 152.

Figure 2:
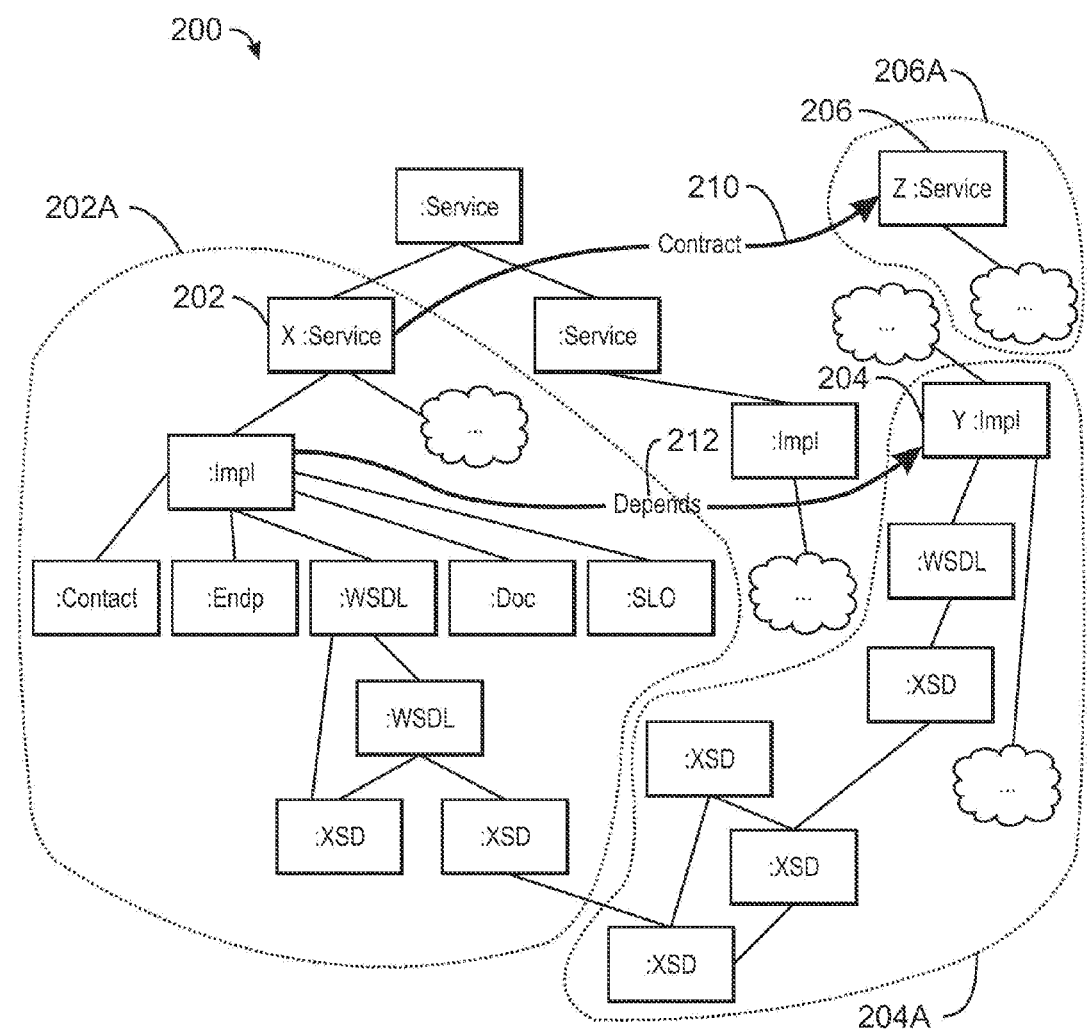
FIG. 2 is a block diagram of a repository for a service-oriented architecture in accordance with an embodiment of the present invention.

FIG. 2 is a block diagram of a repository 200 for a service-oriented architecture in accordance with an embodiment of the present invention. The service-oriented architecture repository 200 may include metadata for services such as a service X and a service Z. The metadata may be organized as artifacts 152, such as X: Service 202, Z: Service 206, and Y: Implementation 204.

The lines connecting the artifacts 152 in the repository 200 may represent the relationships 182. For example, the relationship, (labeled contract 210) between X: Service 202 and Z: Service 206 may indicate that service X depends on service Z.

While the contract 158 is an artifact 152, there may be a relationship from service X, which may be a consumer of the contract, and a consumer of the relationship from the contract provider to service Z. Both mentioned relationships are marked as dependencies—so service X depends on the contract and the contract depends on the service Z.

Additionally, the relationship, depends 212 may indicate that the implementation of service X may depend on, uses part of, implementation Y.

In an embodiment of the invention where the repository 200 is represented as a database, the individual artifacts 152 may be represented as rows in database tables. In such an embodiment, the relationships between the artifacts 152 may be represented as database relationships.

In an embodiment of the invention, any of the artifact types may be migrated to another repository. However, typical service-oriented architecture abstractions may be mapped to multiple artifacts 152. As such, a typical migration may include more than one artifact 152.

In such an embodiment, when one artifact 152 is selected for migration, an artifact closure may be determined. The artifact closure may include all artifacts 152 within a particular abstraction. For example, the repository 200 may include artifact closures 202A for the artifact X: Service 202, artifact closure 204A for the artifact Y: Implementation 204, and artifact closure 206A for the artifact Z: Service 206. The artifact closures 202A, 204A, 206A, may include all artifacts 152 that have aggregate relationships with artifacts 202, 204, 206, respectively.

Figure 3:
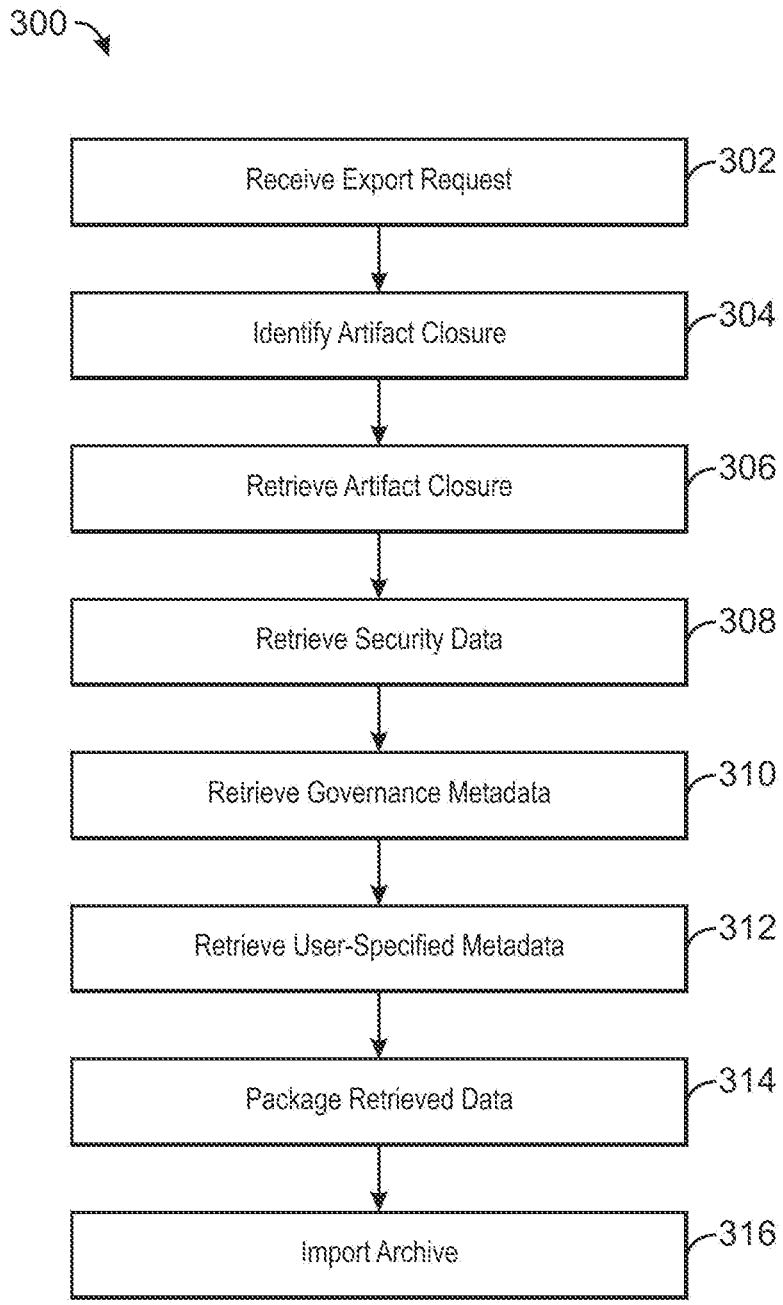
FIG. 3 is a process flow diagram of a method for synchronizing a service-oriented architecture repository in accordance with an embodiment of the present invention.

FIG. 3 is a process flow diagram of a method 300 for synchronizing a service-oriented architecture repository in accordance with an embodiment of the present invention. It should be understood that the process flow diagram is not intended to indicate a particular order of execution.

The method 300 may begin at block 302, when a request to export the artifact 152 is received. The request may specify the artifact 152 to be exported.

At block 304, the artifact closure may be identified. As stated previously, the artifact closure may include all the artifacts 152 that have aggregate relationships with the requested artifact 152.

In an embodiment of the invention, a model of the repository 150 may be used to identify the aggregate relationships. The model may specify types for each relationship 182 in the repository, i.e., aggregate, dependent, or associative.

At block 306, the artifact closure may be retrieved from the repository 150. As stated previously, the artifact closure may include the metadata in the requested artifact 152, and all artifacts 152 with aggregate relationships to the requested artifact 152.

Additionally, the artifact closure may include dependent relationships to the artifact closure. The artifacts 152 that are connected to the artifact closure through the dependent relationships may not be retrieved.

At block 308, security data may be retrieved from the repository 150. The retrieved security data may include the security 186 for each of the artifacts 152 in the artifact closure.

At block 310, the governance metadata 190 may be retrieved from the repository 150. The retrieved governance metadata may include the governance metadata 190 for each of the artifacts 152 in the artifact closure.

At block 312, user-specified metadata may be retrieved from the repository. A user may specify metadata to be included in the export in addition to the artifact closure, security 186, and governance metadata 190. The user-specified metadata may include history 184, classifications 188, and any artifacts 152 specified by the user. The artifacts 152 specified by the user may include artifacts 152 with dependent relationships to the artifact closure.

At block 314, the retrieved data may be packaged into an archive. In an embodiment of the invention, the archive may be serialized and packaged in the form of a ZIP archive.

The archive may contain a manifest that describes the contents of the archive. For example, the manifest may specify a format version, origin uniform resource locator (URL), user requesting the export, date and time of export, source repository name, updates, extensions, base uniform resource locator, model version, cyclic redundancy check (CRC), and a digital signature. The digital signature may be used to set up trust between repositories. When an archive is signed by a trusted repository, the archive can be considered safe for the import to the destination repository.

At block 316, the archive may be imported to the destination repository. In an embodiment of the invention, the user may be shown a preview of the packaged data, from which the user may make selections. For example, the user may select a subset of the packaged data to be imported. The selected data may then be imported to the destination repository.

In one embodiment of the invention, a report of the data that is imported may be generated. The report may be used to provide an audit trail of the import and export processes.

In another embodiment of the invention, it may be determined whether a classification 188 is missing for the artifacts 152 in the archive. If so, the import may be halted. Additionally, the user may be advised to export the missing classification from the source repository, and re-import.

The import may take into account one or more user-specified options. For example, the user may specify whether the data in the archive or the data in the destination repository takes precedence in the event of a conflict. The user may also specify ownership of the imported data. Additionally, the user may specify whether the relationships 182 in the archive are merged with, or replace the relationships 182 in the destination repository.

Other import options may allow the user to specify whether the security 186 is imported. If the security 186 is imported, the user may specify whether the imported security is merged with or replaces the security 186 in the destination repository. Further, the user may specify whether governance metadata 190, classifications 188, plug-in and extension-related metadata, and configurations are imported to the destination repository.

A configuration may be another type of metadata, such as a server configuration, whether to allow the creation of empty data artifacts 152, how many rows to display in tables, etc. Configurations may be specified per user of the repository 150.

In another embodiment of the invention, the import and export process may be automated. In such an embodiment, an administrator of the destination repository may define a set of artifacts 152 in the source repository to be imported. The administrator may also specify when the import is to take place. The process may be scheduled as a one-time or periodic event.

In still another embodiment of the invention, the method 300 may be used as an integration interface of the repository 150. As such, the format of the archives may be documented and annotated with metadata which allows archive generation by 3rd party tools. In such an embodiment, a customer may create a script that extracts definitions of services from a spreadsheet, and create a package for importing the services to another repository.

Figure 4:
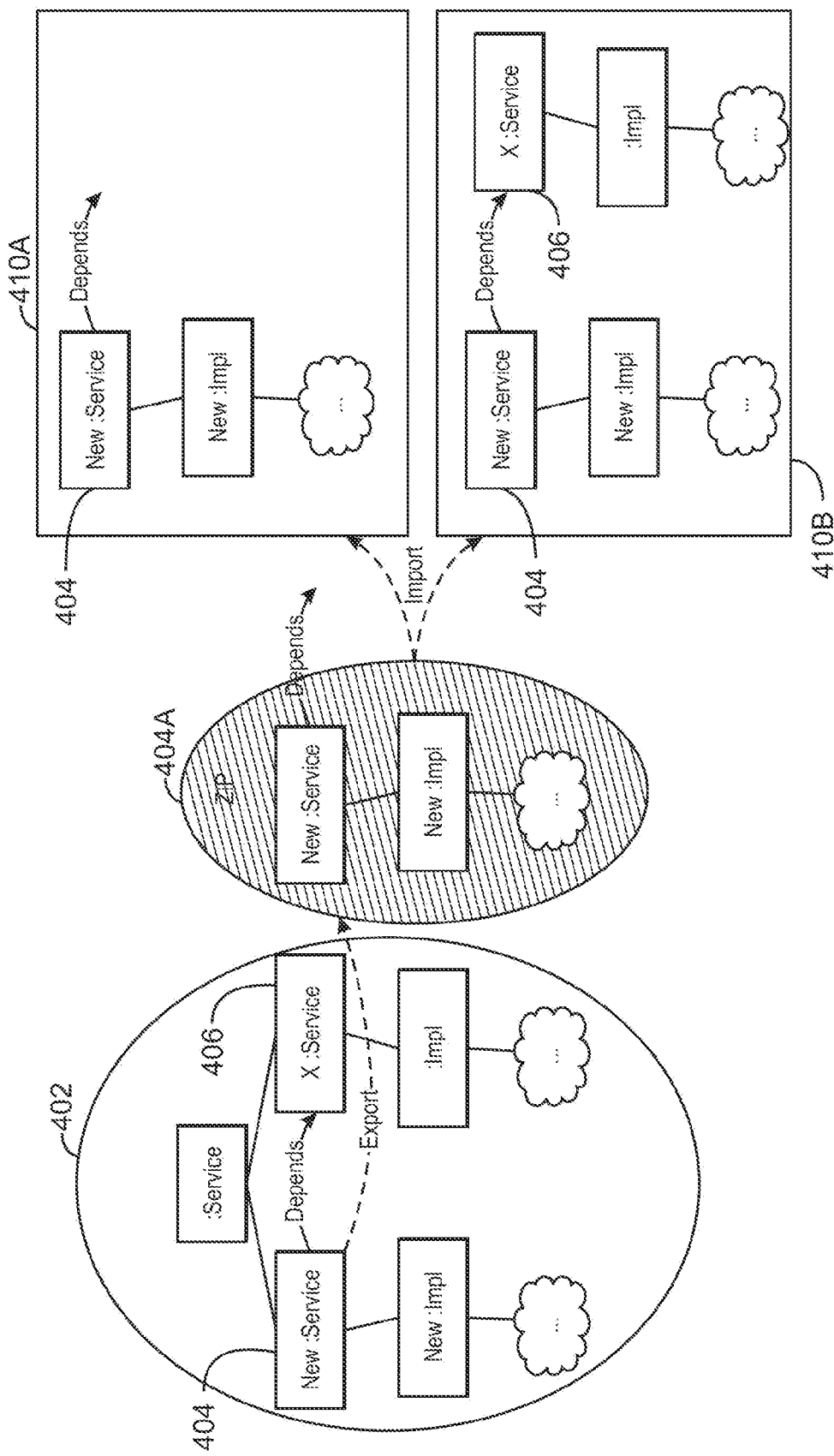
FIG. 4 is a block diagram illustrating a migration of a service in accordance with an embodiment of the present invention.

FIG. 4 is a block diagram illustrating a migration of a service in accordance with an embodiment of the present invention. A repository 402 may include artifacts 152 for a New: Service 404 and an X: Service 406. The New: Service 404 may have a dependent relationship with the X: Service 406.

In a scenario where the New: Service 404 is exported, an artifact closure 404A may be determined for the New: Service 404. As shown, the artifact closure 404A may include the dependent relationship with the X: Service, but not the X: Service 406.

When importing the packaged artifact closure 404A, two scenarios are possible. The first scenario, illustrated in destination repository 410A, is that the destination repository 410A does not include the X: Service 406. As shown, the dependent relationship is imported to the destination repository 410A, but not the X: Service 406.

In a second scenario, illustrated in destination repository 410B, the X: Service 406 exists in the destination repository 410B before the artifact closure 404A is imported. This scenario may arise when the X: Service 406 is migrated to the destination repository 410B before the New: Service 404 is migrated.

As shown, by including the relationships 182 in the artifact closure 404A, enables the correct linking of related artifacts 152 in the destination repository, once both artifacts 152 are imported.

Figure 5:
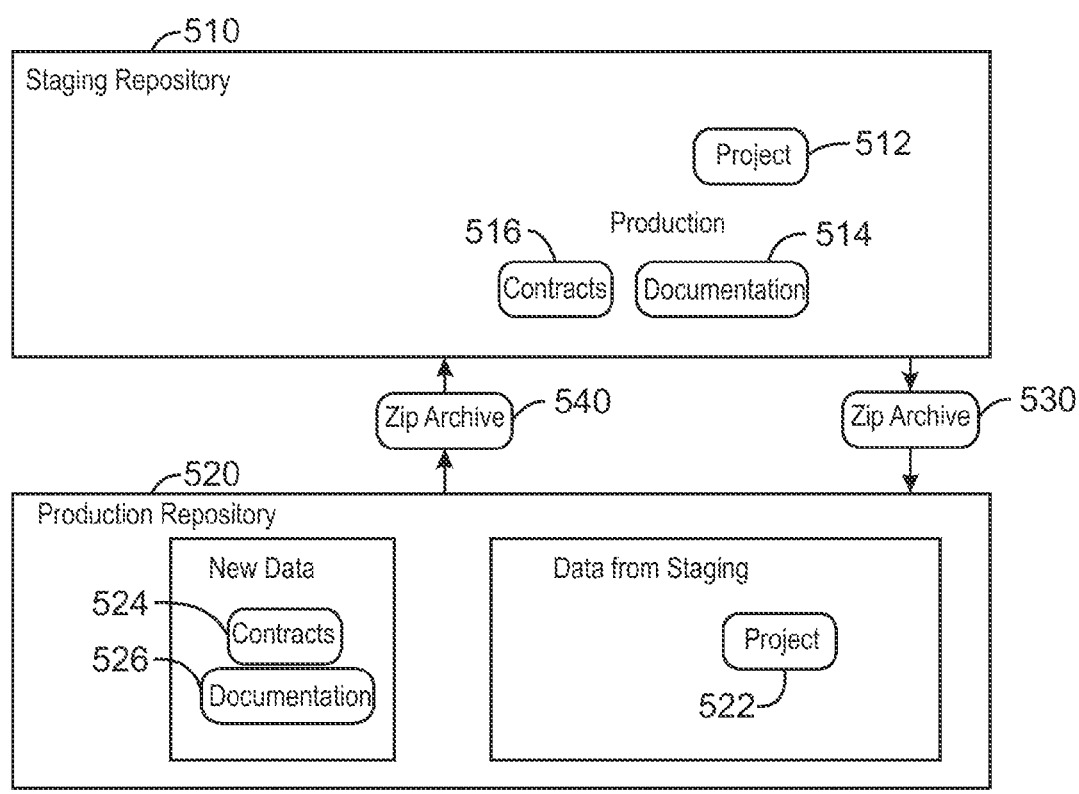
FIG. 5 is a block diagram illustrating two service-oriented architecture repositories in accordance with an embodiment of the present invention.
Figure 6:
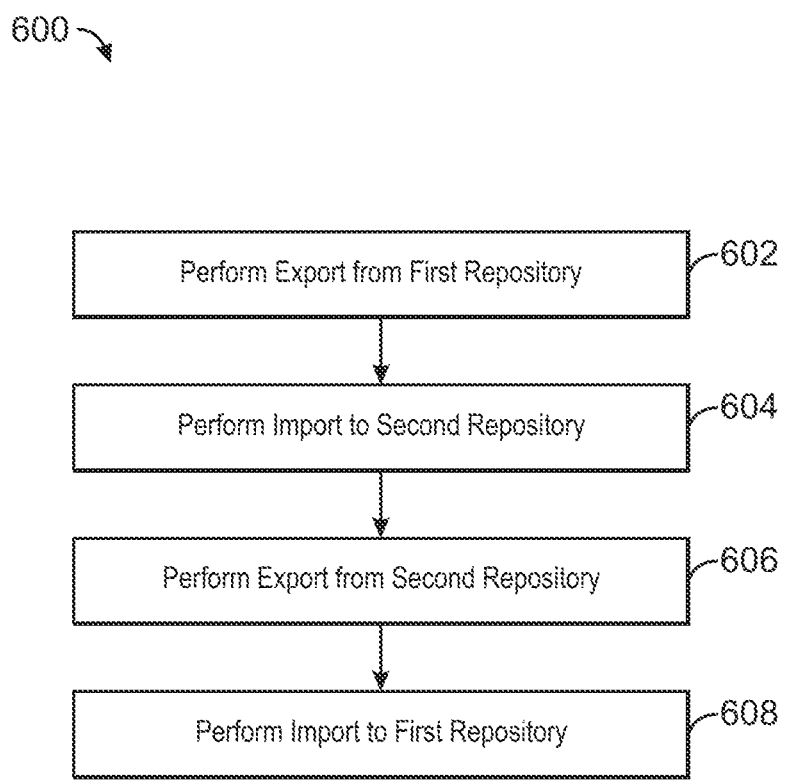
FIG. 6 is a process flow diagram of a method for synchronizing a service-oriented architecture repository in accordance with an embodiment of the present invention.

FIG. 5 is a block diagram illustrating two service-oriented architecture repositories 510, 520 in accordance with an embodiment of the present invention. The repositories 510, 520, may be separated over an air gap, and are described with reference to FIG. 6, which illustrates a process flow diagram of a method for synchronizing service-oriented architecture repositories 510, 520 in accordance with an embodiment of the present invention.

In an embodiment of the invention, bi-directional migrations may be performed between two repositories 510, 520. In such an embodiment, at block 602 an export may be performed from a first repository. For example, the project 512 may be exported from the staging repository 510.

The project 512 may include all the data from the repository 510 that is exported when an artifact 152 is migrated as described above. The project 512 may not include artifacts 152 such as contracts 516 and documentation 514. The project 512 may be exported and packaged in a zip archive 530.

At block 604, an import may be performed to the second repository. For example, the zip archive 530 may be imported to the production repository 520. The data imported from the zip archive 530 may be included in the project 522.

At block 606, an export may be performed from the second repository. For example, new data, such as the contracts 524 and documentation 526 may be exported from the production repository 520 into a zip archive 540.

At block 608, an import may be performed to the first repository. For example, the zip archive 540 may be imported to the documentation 514 and contracts 516 of the staging repository 510.

Figure 7:
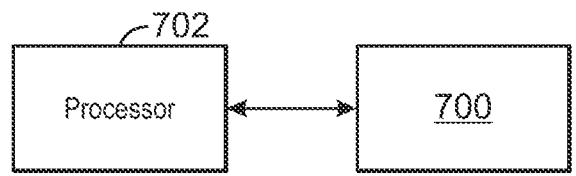
FIG. 7 is a block diagram showing a non-transitory, machine-readable medium that stores code for synchronizing a service-oriented architecture repository.

FIG. 7 is a block diagram showing a non-transitory, machine-readable medium that stores code for synchronizing a service-oriented architecture repository. The non-transitory, machine-readable medium is generally referred to by the reference number 700.

The non-transitory, machine-readable medium 700 may correspond to any typical storage device that stores computer-implemented instructions, such as programming code or the like. For example, the non-transitory, machine-readable medium 700 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

A processor 702 generally retrieves and executes the computer-implemented instructions stored in the non-transitory, machine-readable medium 700 to migrate artifacts 152 between service-oriented architecture repositories. An export request may be received for an artifact 152 in a first repository. An artifact closure may be identified. An artifact closure, security data, governance data, and user-specified metadata may be retrieved from the first repository. The retrieved data may be packaged into an archive that is imported to a second repository.

Figure 8:
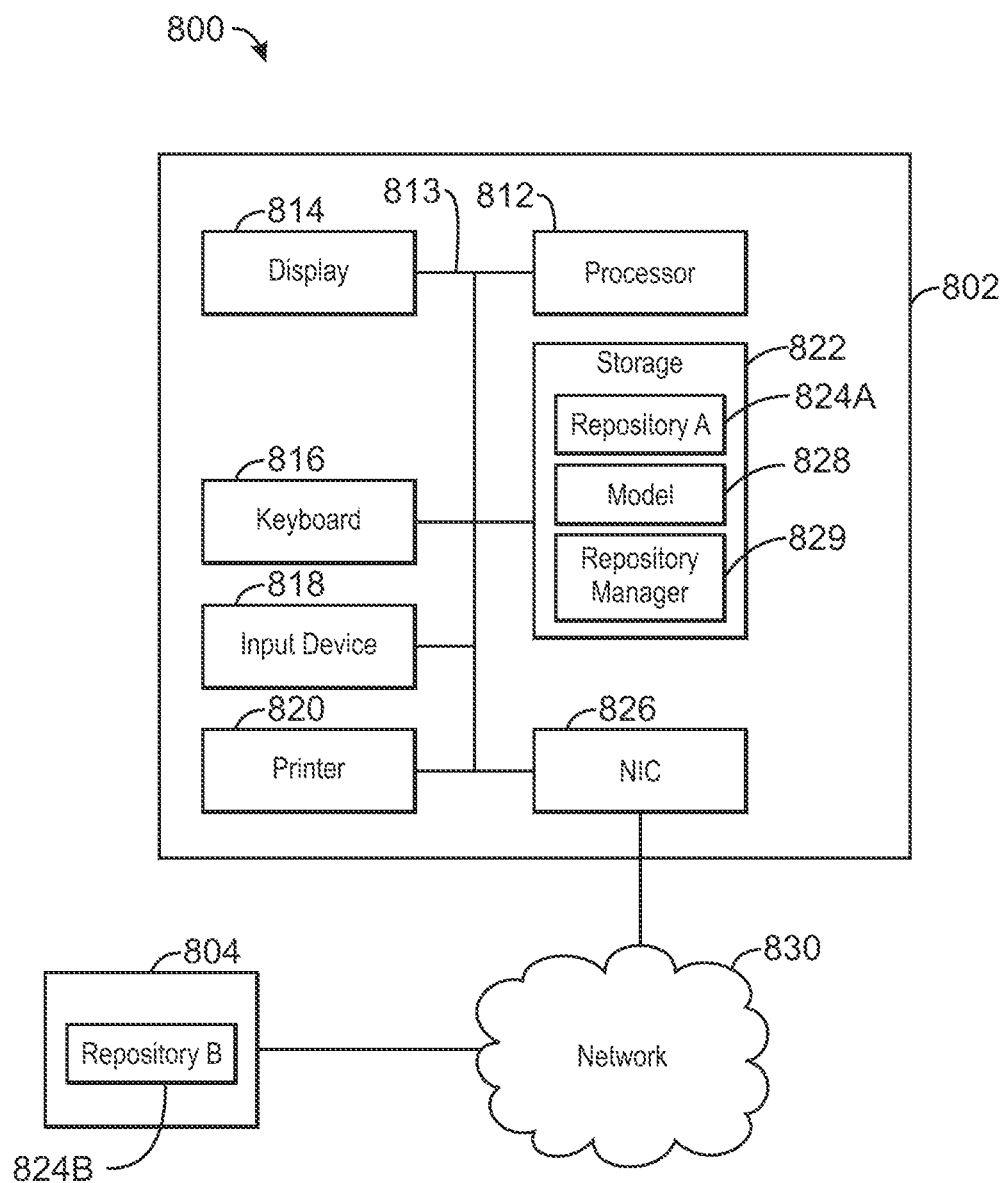
FIG. 8 is a block diagram illustrating a system for synchronizing a service-oriented architecture repository according to an embodiment of the present invention.

FIG. 8 is a block diagram illustrating a system for synchronizing a service-oriented architecture repository according to an embodiment of the present invention. The system is generally referred to by the reference number 800.

Those of ordinary skill in the art will appreciate that the functional blocks and devices shown in FIG. 8 may comprise hardware elements, software elements, or some combination of software and hardware. The hardware elements may include circuitry. The software elements may include computer code stored on a non-transitory, machine-readable medium.

Additionally, the functional blocks and devices of the system 800 are but one example of functional blocks and devices that may be implemented in an embodiment of the present invention. Those of ordinary skill in the art would readily be able to define specific functional blocks based on design considerations for a particular electronic device.

The system 800 may include servers 802, 804, in communication over a network 830. The server 804 may be similarly configured to the server 802.

As shown, the server 802 may include one or more processors 812, which may be connected through a bus 813 to a display 814, a keyboard 816, one or more input devices 818, and an output device, such as a printer 820. The input devices 818 may include devices such as a mouse or touch screen.

The server 802 may also be connected through the bus 813 to a network interface card 826. The network interface card 826 may connect the database server 802 to the network 830.

The network 830 may be a local area network, a wide area network, such as the Internet, or another network configuration. The network 830 may include routers, switches, modems, or any other kind of interface device used for interconnection.

The server 802 may have other units operatively coupled to the processor 812 through the bus 813. These units may include non-transitory, machine-readable storage media, such as storage 822.

The storage 822 may include media for the long-term storage of operating software and data, such as hard drives. The storage 822 may also include other types of non-transitory, machine-readable media, such as read-only memory and random access memory.

The storage 822 may include the software used in embodiments of the present techniques. In an embodiment of the invention, the storage 822 may include a service-oriented architecture repository A 824A, a model 828, and a repository manager 829. The repository manager 828 may migrate artifacts 152 from the repository A 824A to the repository B 824B on the server 804, as described above.

The model 829 may represent a data structure of the repository A 824A. In an embodiment of the invention, the model 829 may specify the relationships between the artifacts 152 of the repository A 824A. The model 829 may also specify the types of each of the relationships, i.e., aggregate, dependent, or associative. As such, the repository manager 828 may use the model to determine artifact closures for artifacts 152 to be migrated from repository A 824A to a repository B 824B.

What is claimed is:

1. A method of migrating artifacts between service-oriented architecture repositories, comprising:
receiving, by a processor, a request to export an artifact from a first repository, wherein the artifact comprises metadata associated with a service-oriented architecture, the request comprising a request to export historical revisions of the artifact;
identifying, by the processor, an artifact closure based on the request, by:
identifying dependent relationships from the artifact to artifacts upon which the artifact depends;
identifying aggregated relationships from the artifact to aggregated artifacts;
identifying artifacts associated with the aggregated relationships; and
identifying artifacts comprising the historical revisions;
retrieving, by the processor, the artifact closure from the first repository; and
packaging, by the processor, the retrieved artifact closure into a data store.

2. The method recited in claim 1, wherein the metadata comprises a service level objective specified by a service level agreement for a service, the artifact representing the service.

3. The method recited in claim 1, wherein the first repository is stored in a database, and wherein the retrieved artifact closure comprises a plurality of rows of a plurality of tables in the database, and wherein a first subset of the plurality of tables is related to a second subset of the plurality of tables in an aggregated database relationship.

4. The method recited in claim 3, wherein columnar data of the first subset of the plurality of tables comprise columnar data of the second subset of the plurality of tables.

5. The method recited in claim 3, comprising:
retrieving data from one or more dependent relationships of the artifact, wherein columnar data of the second subset of the plurality of tables comprise columnar data of the first subset of the plurality of tables; and
copying the data from the one or more dependent relationships of the artifact to a second repository.

6. The method recited in claim 1, wherein the artifact comprises a governance process that is incompatible, and the method comprises:
importing the governance process as separate service; and
deprecating the governance process.

7. The method recited in claim 6, wherein either of the first repository and a second repository is one of:

a software development repository;
a software testing repository;
a software staging repository; and
a software production repository.

8. The method recited in claim 7, comprising:
retrieving data from one or more dependent relationships of the artifact in the second repository; and
copying the data from the one or more dependent relationships of the artifact in the second repository to the first repository.

9. The method recited in claim 8, wherein data from the one or more dependent relationships of the artifact in the second repository comprise contract metadata, ratings metadata, and comment metadata, and wherein the second repository is the software production repository.

10. The method recited in claim 7, wherein the first repository is for a first department of an organization, and the second repository is for a second department of the organization.

11. The method recited in claim 7, wherein the first repository and the second repository are separated by an air gap, and wherein the data store comprises a zip archive.

12. The method recited in claim 1, comprising:
displaying a list of data in the data store;
receiving a user selection of a subset of the data; and
copying the subset of the data to a second repository.

13. A computer system for migrating artifacts between service-oriented architecture repositories, comprising:
a source system comprising a first hardware processor, configured to:
receive a request to export an artifact from a first repository, wherein the artifact comprises metadata associated with a service-oriented architecture, the request comprising a request to export historical revisions of the artifact;
identify an artifact closure based on the request, by:
identifying dependent relationships from the artifact to artifacts upon which the artifact depends;
identifying aggregated relationships from the artifact to aggregated artifacts;
identifying artifacts associated with the aggregated relationships; and
identifying artifacts comprising the historical revisions;
retrieve the artifact closure from the first repository; and
package the retrieved artifact closure into a data store; and
a destination system, comprising a second hardware processor, configured to:
receive the data store; and
copy the data store to a second repository.

14. The computer system recited in claim 13, wherein the artifact closure identifies:
a plurality of artifacts, wherein the plurality of artifacts comprise the artifact;
a plurality of relationships between the plurality of artifacts; and
a plurality of relationship types corresponding to the plurality of relationships, wherein each of the plurality of relationship types comprises one of:
aggregate;
dependent; or
associative.

15. A non-transitory, machine-readable medium comprising machine-readable instructions executable by a processor to migrate artifacts between service-oriented architecture repositories, wherein the machine-readable instructions, when executed by the processor, cause the processor to:
receive an export request for an artifact in a first repository, the request comprising a request to export historical revisions of the artifact, the artifact comprising a governance process that is incompatible;
identify an artifact closure by:
identifying dependent relationships from the artifact to artifacts upon which the artifact depends;
identifying aggregated relationships from the artifact to aggregated artifacts;
identifying artifacts associated with the aggregated relationships; and
identifying artifacts comprising the historical revisions;
retrieve the artifact closure from the first repository;
retrieve security data;
retrieve user-specified metadata;
package the artifact closure, retrieved data, and retrieved metadata into an archive;
import the archive governance process to a second repository wherein the governance process is imported as separate service; and
deprecate governance process.

16. The non-transitory, machine-readable medium recited in claim 15, wherein the machine-readable instructions, when executed by the processor, cause the processor to:
retrieve data from one or more dependent relationships of the artifact, wherein columnar data of a second subset of a plurality of tables comprise columnar data of a first subset of the plurality of tables; and
copy the data from the one or more dependent relationships of the artifact to the second repository.

17. The non-transitory, machine-readable medium recited in claim 15, wherein the machine-readable instructions, when executed by the processor, cause the processor to:
retrieve data from one or more dependent relationships of the artifact in the second repository; and
copy the data from the one or more dependent relationships of the artifact in the second repository to the first repository.

18. The non-transitory, machine-readable medium recited in claim 15, wherein the first repository and the second repository are separated by an air gap.

19. The non-transitory, machine-readable medium recited in claim 15, wherein the archive comprises a zip archive.

20. The non-transitory, machine-readable medium recited in claim 15, wherein the machine-readable instructions, when executed by the processor, cause the processor to:
display a list of data in the archive;
receive a user selection of a subset of the data; and
copy the subset of the data to the second repository.

* * * * *